US012284520B2

(12) United States Patent
Henry et al.

(10) Patent No.: US 12,284,520 B2
(45) Date of Patent: Apr. 22, 2025

(54) ACCESS POINT VERIFICATION USING CROWD-SOURCING

(71) Applicant: Cisco Technology, Inc., San Jose, CA (US)

(72) Inventors: Jerome Henry, Pittsboro, NC (US); Robert E. Barton, Richmond (CA); Stephen Michael Orr, Wallkill, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 561 days.

(21) Appl. No.: 17/556,568

(22) Filed: Dec. 20, 2021

(65) Prior Publication Data
US 2022/0377554 A1 Nov. 24, 2022

Related U.S. Application Data

(60) Provisional application No. 63/190,381, filed on May 19, 2021.

(51) Int. Cl.
H04W 12/08 (2021.01)
H04W 12/03 (2021.01)
(Continued)

(52) U.S. Cl.
CPC .......... *H04W 12/08* (2013.01); *H04W 12/03* (2021.01); *H04W 48/16* (2013.01); *H04W 76/10* (2018.02); *H04W 12/121* (2021.01)

(58) Field of Classification Search
CPC .............................. H04W 84/12; G01S 13/765
(Continued)

(56) References Cited

U.S. PATENT DOCUMENTS

2005/0113090 A1* 5/2005 Sharony ................ H04W 12/12
455/436
2006/0067526 A1* 3/2006 Faccin .................. H04L 9/0844
380/263
(Continued)

FOREIGN PATENT DOCUMENTS

WO 2017078657 A1 5/2017

OTHER PUBLICATIONS

IEEE, "IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 1: Radio Resource Measurement of Wireless LANs", LAN/MAN Standards Committee of the IEEE Computer Society, IEEE Std 802.11k™-2008, Jun. 12, 2008, 244 pages.

(Continued)

Primary Examiner — Fabricio R Murillo Garcia
(74) Attorney, Agent, or Firm — Edell, Shapiro & Finnan, LLC

(57) ABSTRACT

Techniques are provided for verifying Access Points (APs) using crowd sourcing. In one example, a STA establishes a first non-verified connection, based on security material, with a source AP in a wireless infrastructure. A target AP in a wireless infrastructure obtains an indication that the STA is attempting to establish a second non-verified connection with the target AP. In response, the target AP establishes the second non-verified connection based on the security material.

20 Claims, 7 Drawing Sheets

(51) Int. Cl.
*H04W 12/121* (2021.01)
*H04W 48/16* (2009.01)
*H04W 76/10* (2018.01)

(58) Field of Classification Search
USPC .......................................................... 455/411
See application file for complete search history.

(56) References Cited

U.S. PATENT DOCUMENTS

| | | | |
|---|---|---|---|
| 2015/0040195 | A1 | 2/2015 | Park et al. |
| 2015/0117420 | A1* | 4/2015 | Raman ................ H04L 61/5014 |
| | | | 370/338 |
| 2015/0172997 | A1 | 6/2015 | Griot et al. |
| 2015/0365885 | A1* | 12/2015 | Yang ..................... H04W 76/11 |
| | | | 370/312 |
| 2016/0135041 | A1 | 5/2016 | Lee et al. |
| 2016/0295409 | A1* | 10/2016 | Lee ....................... H04W 12/04 |
| 2022/0256350 | A1* | 8/2022 | Bernsen ................ H04W 4/023 |
| 2022/0264668 | A1* | 8/2022 | Lumbatis ............. H04W 76/38 |

OTHER PUBLICATIONS

IEEE, "IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 2: Fast Basic Service Set (BSS) Transition", LAN/MAN Standards Committee of the IEEE Computer Society, IEEE Std 802.11r™-2008, Jul. 15, 2008, 126 pages.
Evgeny Khorov et al., "Current Status and Directions of IEEE 802.11be, the Future Wi-Fi 7", IEEE Access, Digital Object Identifier 10.1109/ACCESS.2020.2993448, May 21, 2020, 25 pages.
Wikipedia, "IEEE 802.11r-2008", May 11, 2021, 4 pages.
Wikipedia, "IEEE 802.11", May 1, 2021, 15 pages.
Wikipedia, "IEEE 802.11k-2008", Sep. 27, 2020, 3 pages.
IEEE, "Standard for Information technology—Telecommunications and information exchange between systems—Local and metropolitan area networks—Specific requirements—Part 11: Wireless LAN Medium Access Control (MAC) and Physical Layer (PHY) Specifications Amendment: Enhanced Broadcast Service", Sep. 27, 2018, 2 pages.
Carol Ansley et al., "IEEE P802.11 Wireless LANs", doc.: IEEE 802.11-19/0151r4, 802.11bc Functional Requirements Document, Jun. 12, 2019, 5 pages.
IEEE Standard Association, "IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 5: Preassociation Discovery", LAN/MAN Standards Committee of the IEEE Computer Society, IEEE Std 802.11aq™-2018, Jun. 14, 2018, 69 pages.
IEEE Standard Association, "IEEE Standard for Information technology—Telecommunications and information exchange between systems Local and metropolitan area networks—Specific requirements Part 11: Wireless LAN Medium Access Control (MAC) and Physical Layer (PHY) Specifications", LAN/MAN Standards Committee of the IEEE Computer Society, Mar. 29, 2012, 2793 pages.
IEEE Standard Association, "IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications", LAN/MAN Standards Committee of the IEEE Computer Society, Dec. 3, 2020, pp. 1-2189.
IEEE Standard Association, "IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications", LAN/MAN Standards Committee of the IEEE Computer Society, Dec. 3, 2020, pp. 2190-4378.
Jouni Malinen, "IEEE P802.11 Wireless LANs", RSNXE interoperability issue, doc.: IEEE 802.11-20/332r1, Feb. 19, 2020, 11 pages.
Mohamed Ibrahim et al., "Verification: Accuracy Evaluation of WiFi Fine Time Measurements on an Open Platform", MobiCom'18, Session: Where are U Now? Localization and Motion Tracking, DOI: 10.1145/3241539.3241555, Oct. 29-Nov. 2, 2018, 12 pages.
D. Harkins, Ed. et al., "Opportunistic Wireless Encryption", Internet Engineering Task Force (IETF), Request for Comments: 8110, ISSN: 2070-1721, Mar. 2017, 12 pages.
Craig Mathias, "Wireless LANs: Is 802.11ax Enough?", IT Pro Today, Jun. 30, 2019, 9 pages.
Takamochi Kanda et al., "ACK-Less Rate Adaptation for IEEE 802.11bc Enhanced Broadcast Services Using Sim-to-Real Deep Reinforcement Learning", arXiv:2104.11811v1 [cs.NI], Apr. 23, 2021, 5 pages.
Monica Alleven, "IEEE releases 802.11aq to better detect WLAN availability", Fierce Wireless, Sep. 19, 2018, 12 pages.
Cisco Meraki, "802.11k and 802.11r Overview", Apr. 20, 2021, 4 pages.
Wi-Fi Alliance, "Wi-Fi CERTIFIED Optimized Connectivity™ enhances Wi-Fi® roaming experience", Feb. 19, 2018, 2 pages; https://www.wi-fi.org/news-events/newsroom/wi-fi-certified-optimized-connectivity-enhances-wi-fi-roaming-experience.
RF Wireless World, "What is IEEE 802.11az | Advantages of 802.11az WiFi Standard", 2012, 6 pages; https://www.fwireless-world.com/Terminology/Benefits-or-Advantages-of-802-11az.html.
Cisco, "Cisco Catalyst 9800 Series Wireless Controller Software Configuration Guide, Cisco IOS XE Gibraltar 16.12.x", Jul. 31, 2019, 1346 pages.
Jeremy Martin et al., "A Study of MAC Address Randomization in Mobile Devices and When it Fails", arXiv:1703.02874v2 [cs.CR], Mar. 31, 2017, 23 pages.
CWNP, "802.11 Fast BSS Transition (FT) Part 2 of 2", Aug. 22, 2007, 4 pages; https://www.cwnp.com/802-11-fast-bss-transition-ft-part-2-of-2/.
CWNP, "802.11i Authentication and Key Management (AKM)", White Paper, Planet3 Wireless, Inc., May 2005, 10 pages.
Cisco Meraki, "802.11 Association Process Explained", retrieved Dec. 10, 2021, 2 pages.

* cited by examiner

# ACCESS POINT VERIFICATION USING CROWD-SOURCING

CROSS REFERENCE TO RELATED APPLICATION

This application claims the benefit of U.S. Provisional Patent Application No. 63/190,381, filed May 19, 2021, the entirety of which is incorporated herein by reference.

TECHNICAL FIELD

The present disclosure relates to wireless communication.

BACKGROUND

Generally, a station (STA) exchanges data with an Access Point (AP) after authenticating and associating with the AP. The STA typically authenticates the AP and then associates with the AP. If authentication or association fail, the data exchange can be prevented for security reasons.

DESCRIPTION OF EXAMPLE EMBODIMENTS

Overview

Techniques are provided for verifying Access Points (APs) using crowd sourcing. In one example, a STA establishes a first non-verified connection, based on security material, with a source AP in a wireless infrastructure. A target AP in a wireless infrastructure obtains an indication that the STA is attempting to establish a second non-verified connection with the target AP. In response, the target AP establishes the second non-verified connection based on the security material.

Example Embodiments

Figure 1:
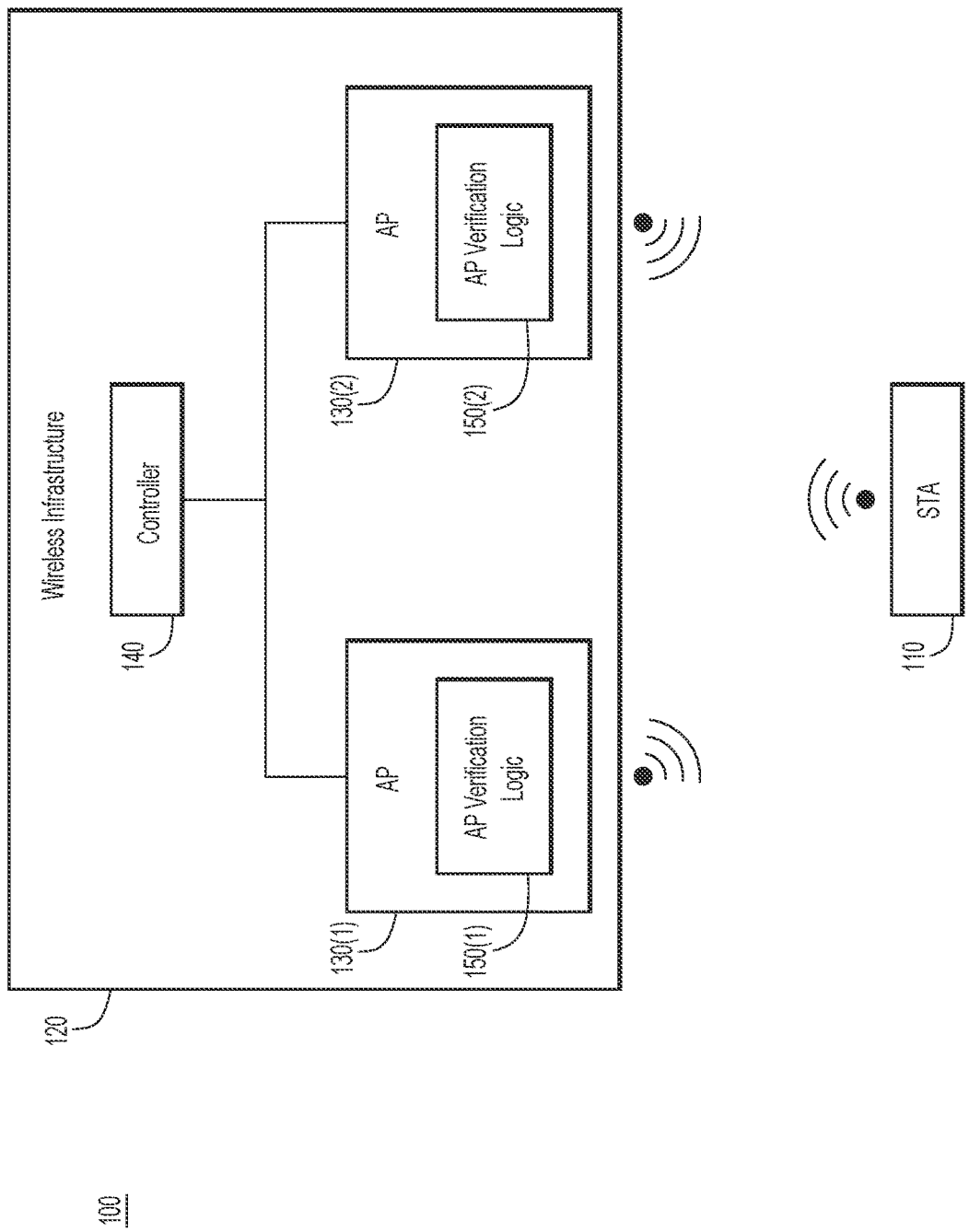
FIG. 1 illustrates a system configured for Access Point (AP) verification using crowd-sourcing, according to an example embodiment.

FIG. 1 illustrates a system 100 configured for Access Point (AP) verification using crowd-sourcing, according to an example embodiment. System 100 includes station (STA) 110 and wireless infrastructure 120. Wireless infrastructure 120, in turn, includes AP 130(1), AP 130(2), and controller 140.

STA 110 may include any suitable device configured to initiate a flow in system 100. For example, STA 110 may include a computer, an enterprise device, an appliance, an Internet of Things (IoT) device, a Personal Digital Assistant (PDA), a laptop or electronic notebook, a smartphone, a tablet, and/or any other device and/or combination of devices, components, elements, and/or objects capable of initiating voice, audio, video, media, or data exchanges within system 100. STA 110 may also include any suitable interface to a human user such as a microphone, a display, a keyboard, or other terminal equipment.

STA 110 may be configured with appropriate hardware (e.g., processor(s), memory element(s), antennas and/or antenna arrays, baseband processors (modems), and/or the like), software, logic, and/or the like to facilitate respective Over-The-Air (OTA) interfaces for accessing/connecting to APs 130(1) and 130(2). It will be appreciated that any number of STAs may be present in system 100.

Wireless infrastructure 120 may provide Wireless Local Area Network (WLAN) coverage for a specific geographic area/location. For example, wireless infrastructure 120 may serve an airport, a shopping mall, train station, venue, etc. Wireless infrastructure 120 may also be referred to as a Distribution System (DS).

APs 130(1) and 130(2) may be WLAN APs configured with appropriate hardware (e.g., processor(s), memory element(s), antennas and/or antenna arrays, baseband processors (modems), and/or the like), software, logic, and/or the like to provide OTA coverage for a WLAN access network (e.g., Wi-Fi®). In various embodiments, APs 130(1) and 130(2) may be implemented as Wi-Fi APs and/or the like. It will be appreciated that any number of APs may be present in system 100.

Controller 140 may be a management device or software process associated with wireless infrastructure 120. For example, controller 140 may be a general management entity/structure, such as a WLAN controller, configured to manage APs 130(1) and 130(2). Controller 140 may provide or be responsible for WLAN functions such as WLAN-based access authentication services, authorization services, intrusion prevention, Radio Frequency (RF) management, and/or the like to facilitate STA 110 connectivity via APs 130(1) and 130(2). In one form, controller 140 may be a software process running on one or more servers in the cloud (on any server in a datacenter or at any location with Internet connectivity).

More and more IEEE 802.11 applications are used that involve STA 110 querying APs 130(1) and 130(2) before (or without) association. In this process, STA 110 might collect information from AP 130(1). The information may be about AP 130(2), or STA 110 may compare the information with information obtained from AP 130(2). In one example, STA 110 may obtain information from AP 130(1) and, optionally, a list of neighboring APs (e.g., AP 130(2)). STA 110 may then contact AP 130(2) and compare the information obtained from AP 130(1) to determine, for instance, whether AP 130(2) can provide faster uplink, additional service Y, range Z, etc. For example, STA 110 may exchange information with APs 130(1) and 130(2), such as capabilities, data broadcast information, or more details about the supporting network through Access Network Query Protocol (ANQP) messages.

For example, AP 130(1) may provide a list of neighbors (e.g., including AP 130(2)) to STA 110. With Wi-Fi Alliance (WFA) Multi Band Operation (MBO), the list may be directed and used to recommend a more suitable AP for STA 110. Or STA 110 may range against AP 130(1) and obtain, from AP 130(1), a list of other APs—along with their individual locations—against which to range. With WFA Optimized Connectivity (OCE), STA 110 can query APs 130(1) and 130(2) for their respective uplink performances. Alternatively, STA 110 can obtain, from APs 130(1) and 130(2), information about services reachable through the respective AP (e.g., printing service). In still another example, STA 110 can share or obtain information about video broadcast services reachable through APs 130(1) and 130(2).

In each of these scenarios, STA 110 is not associated to APs 130(1) or 130(2) before the data exchanges; instead, the exchanges occur pre-association or without association to APs 130(1) and 130(2). STA 110 may, at some later point in time, associate to one of APs 130(1) or 130(2), but not both. As a result, because no Pairwise Master Key (PMK) challenge is exchanged, STA 110 is unable to obtain a proof of legitimacy from APs 130(1) and 130(2).

Furthermore, in many environments, STA 110 may need to establish an encrypted connection to multiple APs (e.g., APs 130(1) and 130(2)) in succession and with short intervals. For example, the Fine Timing Measurement (FTM) procedure supposes that a STA would measure its distance to multiple APs (which individual location is shared), and deduce from these measures its own location. These exchanges are often poorly protected from eavesdroppers and suffer from low privacy. Today, a STA would need to establish an encrypted link to each AP in a rapid and consecutive manner, which requires an unreasonable amount of time.

Thus, an attacker may insert a malicious AP that is pretending to be part of wireless infrastructure 120, or an evil twin that is impersonating one of APs 130(1) or 130(2). The attacker can exploit this security gap to provide invalid information, resulting in potentially severe consequences. For example, a robot can be driven off course with invalid location or ranging information; an offensive video or deep fake content can be broadcast in public venues; fake attractive services can be announced by honeypot APs; or a life/business-critical device can be redirected to a radio with no available resources. Other consequences can also result from low security.

Accordingly, in order to improve the security of wireless infrastructure 120 for non-verified connections, AP verification logic 150(1) and 150(2) are provided on AP 130(1) and 130(2), respectively. Briefly, AP verification logic 150 (1) and 150(2) enables STA 110 to obtain a reasonable indication that AP 130(1) and 130(2) both belong to the same wireless infrastructure (here, wireless infrastructure 120), thereby maximizing the chances that AP 130(1) and 130(2) are actually part of the same infrastructure.

In one example, STA 110 may establish a first non-verified connection with AP 130(1) based on security material. The security material may be secure link material such as a key and/or a key name. Later, AP 130(2) may obtain an indication that STA 110 is attempting to establish a second non-verified connection with AP 130(2). In response to obtaining the indication that STA 110 is attempting to establish the second non-verified connection with AP 130 (2), AP 130(2) may establish the second non-verified connection based on the security material.

A connection may be "verified" if it involves a reciprocal or symmetric validation of the true identities of the entities forming the connection. Thus, for example, if STA 110 and AP 130(1) establish a connection without performing a reciprocal or symmetric validation of the true identities of STA 110 and AP 130(1)—that is, if STA 110 does not validate the true identity of AP 130(1) and/or AP 130(1) does not validate the true identity of STA 110—then that connection may be "non-verified."

In some examples, techniques are provided to facilitate a secure key exchange between STA 110 and APs 130(1) and 130(2) without wasting time on each AP channel before ranging can start. If STA 110 exchanges information with AP 130(1) and AP 130(2), STA 110 may determine whether both APs 130(1) and 130(2) are part of the same infrastructure (e.g., the same Extended Service Set (ESS)). This may reduce the risk that STA 110 is connecting with an illegitimate attacker AP that is announcing the same Service Set Identifier (SSID) as wireless infrastructure 120 or spoofing a Media Access Control (MAC) address of one of (legitimate) APs 130(1) and 130(2).

These techniques may also enable STA 110 to obtain an indication that APs 130(1) and 130(2) are part of the same system, thereby improving the reliability of the information obtained from APs 130(1) and 130(2). Using mechanisms provided herein, STA 110 may establish an encrypted link to AP 130(2), and obtain an indication that AP 130(2) is likely part of the same system as AP 130(1).

Because the security of the link is verified through AP 130(1) but the attacker lacks a trusted link with AP 130(1), an attacker spoofing the MAC address of AP 130(2) would not have the ability to exchange the security material within wireless infrastructure 120 and thus would fail to properly respond to STA 110. Similarly, an attacker that is spoofing AP 130(1), or pretending to be a valid AP (and to which STA 110 would connect first), would fail to relay the security material to AP 130(2). In both cases, STA 110 may isolate the attacker AP and identify it as an outlier. Thus, STA 110 may have a reasonable assurance that all APs it communicates with (e.g., APs 130(1) and 130(2)) are part of the same system (e.g., wireless infrastructure 120).

Techniques provided herein may use crowd-sourcing to identify legitimate APs, e.g., by determining that both AP 130(1) and AP 130(2) belong to the same wireless infrastructure (wireless infrastructure 120). The crowd-sourcing techniques may be enabled using the same security material to establish respective non-verified connections with APs 130(1) and 130(2).

Techniques described herein may apply to a multi-AP scenario to provide to STA 110 an indication that APs 130(1) and 130(2) can communicate with one another, and thus have established a trusted relationship over a network (e.g., through a wired communication, directly or via controller 140). Such communication is not a guarantee that APs 130(1) and 130(2) are legitimate, but offers a reasonable indication that, if AP 130(1) provides some information, AP 130(2) is likely to provide information that is consistent with that of AP 130(1).

Generally, the largest group of APs may be the most trusted. This is a valid assumption because, to break that assumption, the attacker would have to maintain an illegitimate wireless infrastructure of APs that is at least as large as (legitimate) wireless infrastructure 120. For example, a large venue accessible to the general public is likely to include multiple legitimate APs (e.g., APs 130(1) and 130(2)), which are all part of the same system (e.g., wireless infrastructure 120, for example "mall Wi-Fi"). There may also be some APs that are legitimate, but that are not part of a larger system (e.g., a small store individual AP). Further, there may be one or more illegitimate APs (e.g., attacker APs).

Therefore, techniques described herein may provide an element of crowd wisdom, whereby STA 110 can build confidence that a set of APs (e.g., including APs 130(1) and 130(2)) is coherent. This confidence is useful if, for example, STA 110 needs to exchange information with both APs 130(1) and 130(2) in a short amount of time, and use that information to make a decision. For example, if APs 130(1) and 130(2) provide coherent location and ranging information and can communicate with one another, but another AP provides incoherent ranging or location information and cannot communicate with APs 130(1) or 130(2), then a location algorithm running on STA 110 may classify the other AP as a suspicious outlier (e.g., a possible evil twin), even if the other AP announced the same SSID as APs 130(1) and 130(2), and even if APs 130(1) and 130(2) indicate that the MAC address of the other AP (e.g., Basic SSID (BSSID)) is known.

Without knowledge of such backend-trusted communication, STA 110 may be left with location values provided by three APs of equal legitimate value. This may also apply to other non-verified exchanges, for which STA 110 may form coherent groups of legitimate APs. In certain examples, the legitimacy of APs 130(1) and 130(2) may be determined on a per-STA basis. That is, each STA (e.g., STA 110) may begin with zero trust and build its own trust for APs (e.g., AP 130(1) and AP 130(2)).

The techniques described herein may apply to at least two possible modes: (a) an association mode in which STA 110 associates to AP 130(1) and then subsequently associates to AP 130(2)—and; (b) an unassociated mode in which STA 110 does not associate to AP 130(1) or AP 130(2). Both modes allow for exchange of information without authentication. In either case, because APs 130(1) and 130(2) may connect to the same wired network and/or may be managed by controller 140, APs 130(1) and 130(2) may be able to communicate via wireless infrastructure 120.

In one example, the association mode may use Opportunistic Wireless Encryption (OWE) techniques. OWE specifies an extension to provide for opportunistic (non-verified) encryption to wireless media via an AP. In OWE, a STA can form an encrypted connection with an AP by performing association operations without mutual authentication. Thus, OWE allows a STA to establish a secured, but non-verified, link with an AP.

Briefly, an OWE procedure may begin when an AP announces support for OWE. In response, the STA may perform "open" authentication, and the OWE association inserts a Diffie-Hellman (DH) key exchange in accordance with "open" choreography, and a PMK may be exchanged. OWE enables a STA to actively exchange data through an AP (e.g., to use a service beyond the AP, to send and receive TV broadcast information, to access the Internet, etc.). OWE is limited to single APs because OWE requires the STA to perform an association for each AP. Also, traditionally, OWE does not provide authentication; as a result, the STA is generally unaware of whether the AP is legitimate (e.g., whether the AP is part of the local network infrastructure or instead belongs to an attacker).

Therefore, techniques are provided to extend OWE to define a Fast Transition (FT) mode ("OWE-FT"). Using OWE-FT, STA 110 may ensure that APs 130(1) and 130(2)—which may announce support for the same SSID to indicate that they are part of the same infrastructure—have indeed established a trusted connection with each other. OWE-FT may provide a solution for multi-AP environments, such as airports, train stations, conference centers, and any hotspot-like network that has more than one AP.

OWE-FT may provide a cryptographic assurance that a target AP (e.g., AP 130(2)) with which a STA (e.g., STA 110) has established an OWE-FT connection is derived from an OWE-FT connection to the current/source AP (e.g., AP 130(1)). This assurance may indicate that both APs 130(1) and 130(2) have a trusted network connection with each other, and thus the information provided by both APs 130(1) and 130(2) are likely coherent. When a large set of APs (e.g., including APs 130(1) and 130(2)) provide coherent information and allow for OWE-FT communication, it is likely that all the APs are part of the same system (e.g., wireless infrastructure 120).

OWE-FT may be compatible with 802.11 environments including multiple APs, where encrypted connections are expected between one client (e.g., STA 110) and more than one AP (e.g., APs 130(1) and 130(2)). APs 130(1) and 130(2) may belong to the same ESS, and thus may communicate with each other over wireless infrastructure 120. In one example, STA 110 may pre-establish a secure link with AP 130(2) before actually exchanging information with AP 130(2). This may help STA 110 exchange information with APs 130(1) and 130(2) in rapid succession, without investing a lot of time on each new channel to build the data communication channel.

In one example, STA 110 may establish a first OWE connection with AP 130(1) based on security material, such as a key and/or a key name. AP 130(2) may obtain an indication that STA 110 is attempting to establish a second OWE connection with AP 130(2). In response to obtaining the indication that STA 110 is attempting to establish the second OWE connection with AP 130(2), AP 130(2) may establish the second OWE connection based on the security material.

In one example, the unassociated mode may use Pre-Association Security Negotiation (PASN) techniques. PASN specifies an extension to provide an encrypted link to an AP without association. Thus, in PASN, a STA can connect to an AP without performing a formal association. For example, the STA and AP can merge their respective keys to create a tunnel for temporarily exchanging data. As a result, PASN allows a STA to connect to an AP, trust the AP at first sight, and exchange keys over a secure connection without requiring association.

PASN may be used in situations where the STA exchanges data with the AP without sending data beyond the AP, and/or where the STA receives data through the AP without association. For example, PASN may be used for FTM, television broadcast receive-only mode, etc. However, like OWE, PASN does not envision the case of multiple APs. Therefore, techniques are provided to extend PASN to define an FT mode ("PASN-FT"). These techniques may be particularly useful in 802.11 environments that include multiple APs, where a STA is expected to establish encrypted connections with multiple APs that belong to a common ESS (e.g., communicate over a common infrastructure).

In PASN-FT, STA 110 may perform an efficient and protected exchange burst with multiple APs (e.g., APs 130(1) and 130(2)) without an initial association. There are multiple cases where such an exchange may be repeated with multiple APs in sequence, including FTM, Enhanced Broadcast Services (EBCS) and ANQP exchanges, Pre-Association Discovery (PAD) queries, National Security and Emergency Preparedness (NSEP) priority access requests, ANQP queries, link measurements, etc. Optionally, PASN- FT may allow STA 110 and/or APs 130(1) and/or 130(2) to exchange pre-established keying material, such as a shared password (e.g., base Authentication and Key Management (AKM) material). Briefly, STA 110 may establish a secure link/connection to AP 130(2). In certain examples, STA 110 may operate the secure link directly with AP 130(2) using three frames.

In one example, STA 110 may establish a first PASN connection with AP 130(1) based on security material, such as a key and/or a key name. AP 130(2) may obtain an indication that STA 110 is attempting to establish a second PASN connection with AP 130(2). In response to obtaining the indication that STA 110 is attempting to establish the second PASN connection with AP 130(2), AP 130(2) may establish the second PASN connection based on the security material.

As explained in greater detail below in connection with FIGS. 2 and 3, STA 110 may establish a PASN-FT session with AP 130(1) and use FT-style over-the-DS or OTA communications to establish keying with AP 130(2). As an alternative to PASN-FT OTA, STA 110 may establish a PASN-FT connection with the AP 130(2) with the same count of frames as the PASN-FT would consume pre-establishment. However, PASN-FT OTA may verify that AP 130(1) is connected over wireless infrastructure 120 to AP 130(2). PASN-FT over-the-DS may also make this verification. In either PASN-FT mode, STA 110 may jump to AP 130(1) and (almost) immediately proceed to performing encrypted exchanges.

Thus, techniques described herein may extend OWE and PASN by establishing OWE and PASN security/keying material at multiple APs (e.g., APs 130(1) and 130(2)). STA 110 may establish keying material before establishing connections with APs 130(1) and 130(2), thereby enabling OWE-FT and PASN-FT.

If STA 110 connects to AP 130(1) and may at some later time attempt to transition to AP 130(2), AP 130(1) may help prove to STA 110 that AP 130(2) is part of the same system as AP 130(1) (e.g., wireless infrastructure 120). At least two modes are provided to enable AP 130(1) to help prove that AP 130(2) belongs to the same system as AP 130(1): OTA mode and over-the-DS mode. OTA mode and over-the-DS mode may each be compatible with OWE-FT and PASN-FT.

In over-the-DS mode, STA 110 may establish a connection to AP 130(1). STA 110 may detect AP 130(2) during a scanning phase. STA 110 may send, to AP 130(1), a request to help STA 110 connect to AP 130(2). In one example, AP 130(1) may provide security (e.g., key) material over the DS (e.g., over the wire/cable) to AP 130(2). If AP 130(2) has an over-the-DS connection with AP 130(1), AP 130(2) may use the key material to understand and decipher the communications sent by STA 110. The connection may be immediate, thereby avoiding unnecessary negotiation and wasted time.

In OTA mode, STA 110 establishes a connection to AP 130(1). STA 110 may retrieve, over the secured link, a neighbor report, including the list of neighbors about which the AP 130(1) is aware. The list of neighbors may include AP 130(2). STA 110 may establish a secure connection with one or more of these neighbors, including AP 130(2). STA 110 may provide, to AP 130(2), an indication that STA 110 is coming from AP 130(1). In response, AP 130(2) may communicate with AP 130(1) over wireless infrastructure 120. In some examples, this may allow STA 110 to negotiate keys OTA with AP 130(2) while connected to AP 130(1).

Thus, in over-the-DS mode, the target AP (e.g., AP 130(2)) may obtain an indication that STA 110 is attempting to establish a second non-verified connection from the source AP (e.g., AP 130(1). Meanwhile, in OTA mode, the target AP (e.g., AP 130(2)) may obtain an indication that STA 110 is attempting to establish a second non-verified connection from STA 110. Over-the-DS may be more useful if STA 110 has a strong connection to AP 130(1), and OTA mode may be used when STA 110 has a weak connection to AP 130(1). In either mode, STA 110 may establish a connection to AP 130(2) with the help of AP 130(1).

AP 130(2) may obtain the security material from AP 130(1) and/or controller 140 before, or in response to, obtaining the indication that STA 110 is attempting to establish the second non-verified connection with AP 130(2). In one example, STA 110 may establish multiple secure connections to each AP with which STA 110 intends to communicate in the near future (e.g., APs 130(1) and 130(2)). At any suitable time (e.g., within the timeout value returned by each of APs 130(1) and 130(2)), STA 110 may switch directly to the AP channel of AP 130(2) and proceed to exchange secure frames.

AP 130(2) may obtain the security material from AP 130(1) and/or controller 140. In one example, AP 130(1) may send the security material to AP 130(2) via wireless infrastructure 120 using any suitable protocol (e.g., Inter-AP Protocol (IAPP), CAPWAP, a proprietary protocol, etc.). Additionally/alternatively, controller 140 may send the security material to AP 130(2) via wireless infrastructure 120.

In one example, the security material may be a key and/or a key name. For instance, the security material may be PMKR0, which is a root key from which both AP 130(1) and AP 130(2) derive their own unique, respective PMKR1 keys. Alternatively, the security material may be PMKR0Name, which is a string that is attached to, and used to reference, PMKR0.

In a first example, PMKR0 may be created above AP 130(1) and AP 130(2) in controller 140. In that case, controller 140 may distribute the PMKR0 to APs 130(1) and 130(2). Because AP 130(2) has already obtained the PMKR0 from controller 140, AP 130(1) may provide to AP 130(2) the PMKR0Name instead of the PMKR0 itself. AP 130(1) may provide to AP 130(2) the PMKR0Name in both over-the-DS mode and OTA mode. Furthermore, it will be appreciated that controller 140 may name each PMKR0 differently. For instance, if controller 140 changes the PMKR0 weekly, controller 140 may implement incremental PMKR0Name changes to ensure that both AP 130(1) and AP 130(2) use the correct/latest PMKR0.

In a second example, the PMKR0 may be generated in AP 130(1). In that case, AP 130(1) may provide the PMKR0 itself to AP 130(2). In over-the-DS mode, STA 110 may request AP 130(1) to facilitate the connection with AP 130(2), and in response AP 130(1) may provide the PMKR0 to AP 130(2) over the trusted wire. In OTA mode, STA 110 may request AP 130(2) to contact AP 130(1) over the trusted wire, and AP 130(1) may reply with the PMKR0. In either mode, AP 130(2) may obtain the PMKR0. In certain examples, APs 130(1) and 130(2) may have different PMKR0s, albeit at the cost of higher overhead.

Techniques described herein may apply in the context of Randomized And Changing MAC Address (RCM) scenarios. STA 110 may use RCM to obfuscate its identity from APs 130(1) and/or 130(2) by creating a first MAC address, connecting with AP 130(1) based on the first MAC address, changing/rotating to a second MAC address, and ranging with AP 130(2) using the second MAC address.

RCM techniques may prevent wireless infrastructure 120 from tracking STA 110. Specifically, without mutual authentication in OWE and/or PASN, AP 130(2) may be unaware of whether the MAC addresses that establish the two consecutive sessions represent a single STA (e.g., STA 110). That is, the new MAC address being used by STA 110 may not be known by AP 130(2). Accordingly, techniques described herein may enable STA 110 to notify wireless infrastructure 120 (e.g., via AP 130(1)), that STA 110 is going to try to connect to AP 130(2) using a different MAC address. In particular, these techniques may enable FT during secure RCM non-verified exchanges.

In one example, STA 110 may establish the first non-verified connection with AP 130(1) using a first MAC address of STA 110. AP 130(2) may obtain an indication that STA 110 is attempting to establish a second non-verified connection with AP 130(2) using a second MAC address of STA 110. In response to obtaining the indication that STA 110 is attempting to establish the second non-verified connection with AP 130(2), AP 130(2) may establish the second non-verified connection based on the security material.

Both the OTA and over-the-DS modes may be RCM-friendly. In OTA mode, because STA 110 may send the request to AP 130(2) with the new MAC address, AP 130(1) may not observe the new MAC address. Therefore, in OTA mode, wireless infrastructure 120 may determine that STA 110 has associated to another AP of wireless infrastructure 120 (e.g., AP 130(2)), but not the prior MAC address identity of STA 110.

The over-the-DS mode may permit STA 110 to announce, in the request for AP 130(2), a MAC address that is different from the MAC address currently being used with AP 130(1). More specifically, AP 130(1) may send the new MAC address to AP 130(2). This may allow wireless infrastructure 120 to determine that both MAC addresses map to STA 110. As a result, STA 110 may immediately send encrypted traffic to AP 130(2) using the new MAC address.

Figure 2:
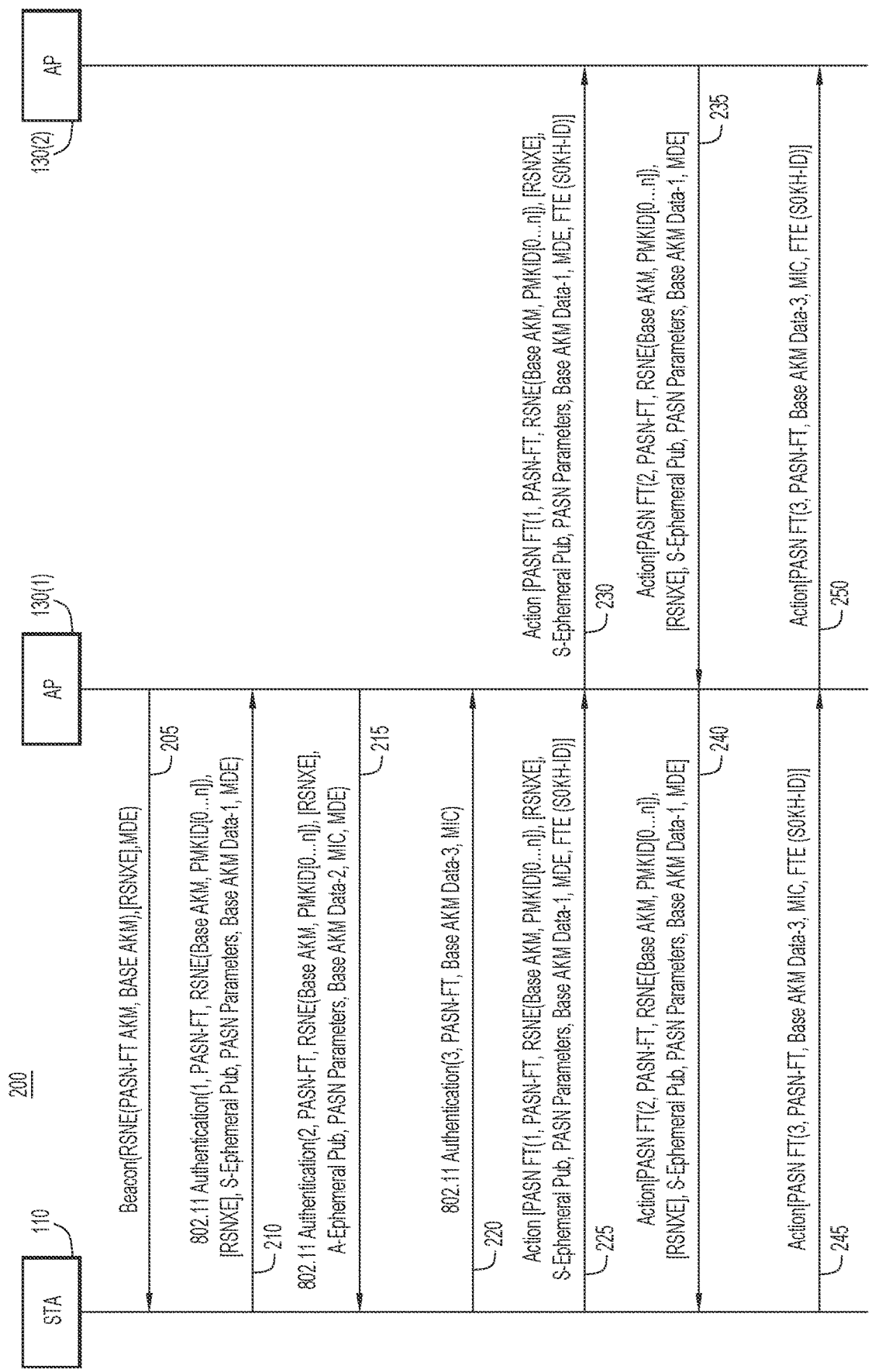
FIG. 2 illustrates a flow diagram of a method for AP verification using crowd-sourcing for an over-the-Distributed System (DS) Pre-Association Security Negotiation (PASN) scenario, according to an example embodiment.
Figure 3:
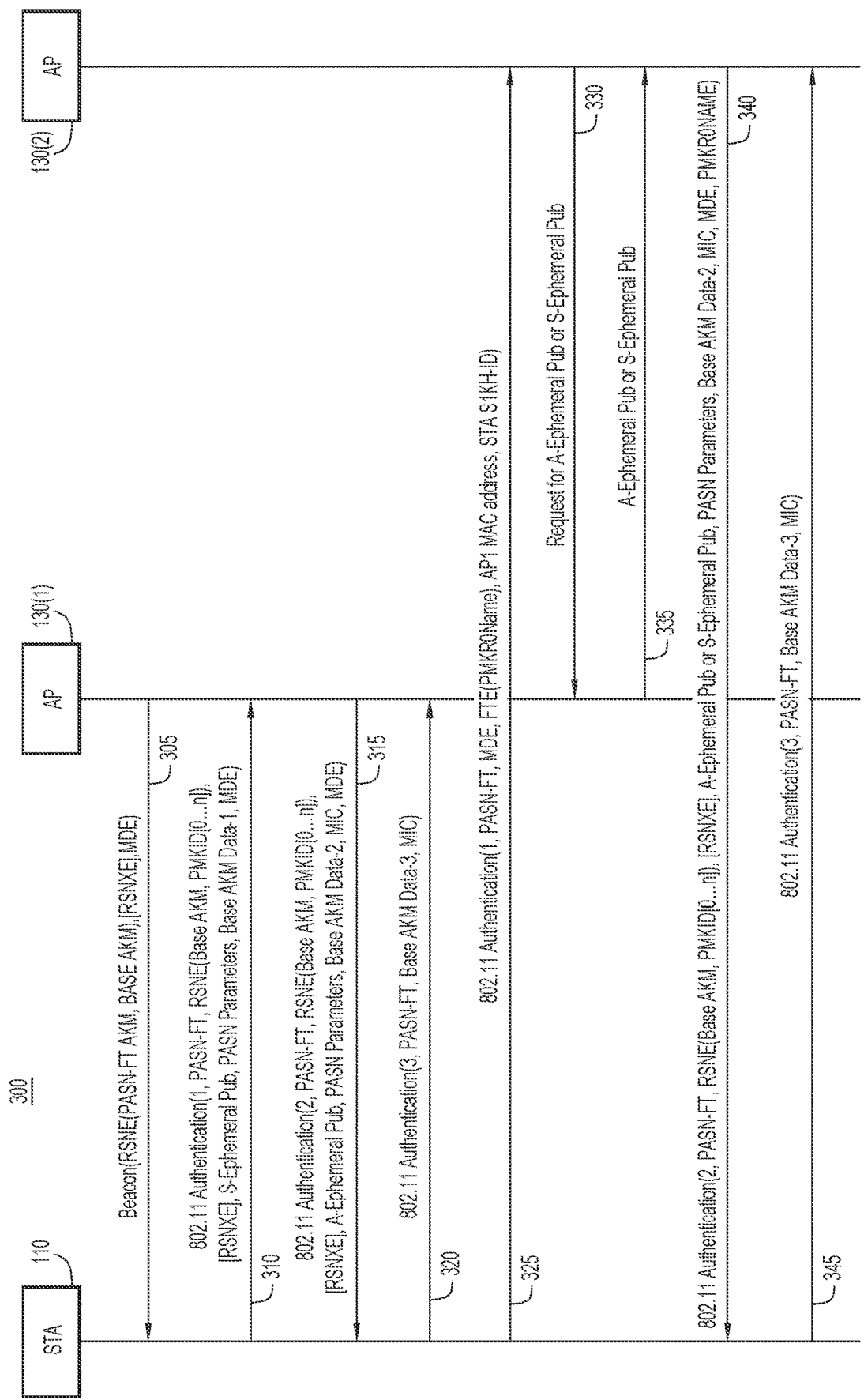
FIG. 3 illustrates a flow diagram of a method for AP verification using crowd-sourcing for an Over-The-Air (OTA) PASN scenario, according to an example embodiment.
Figure 4:
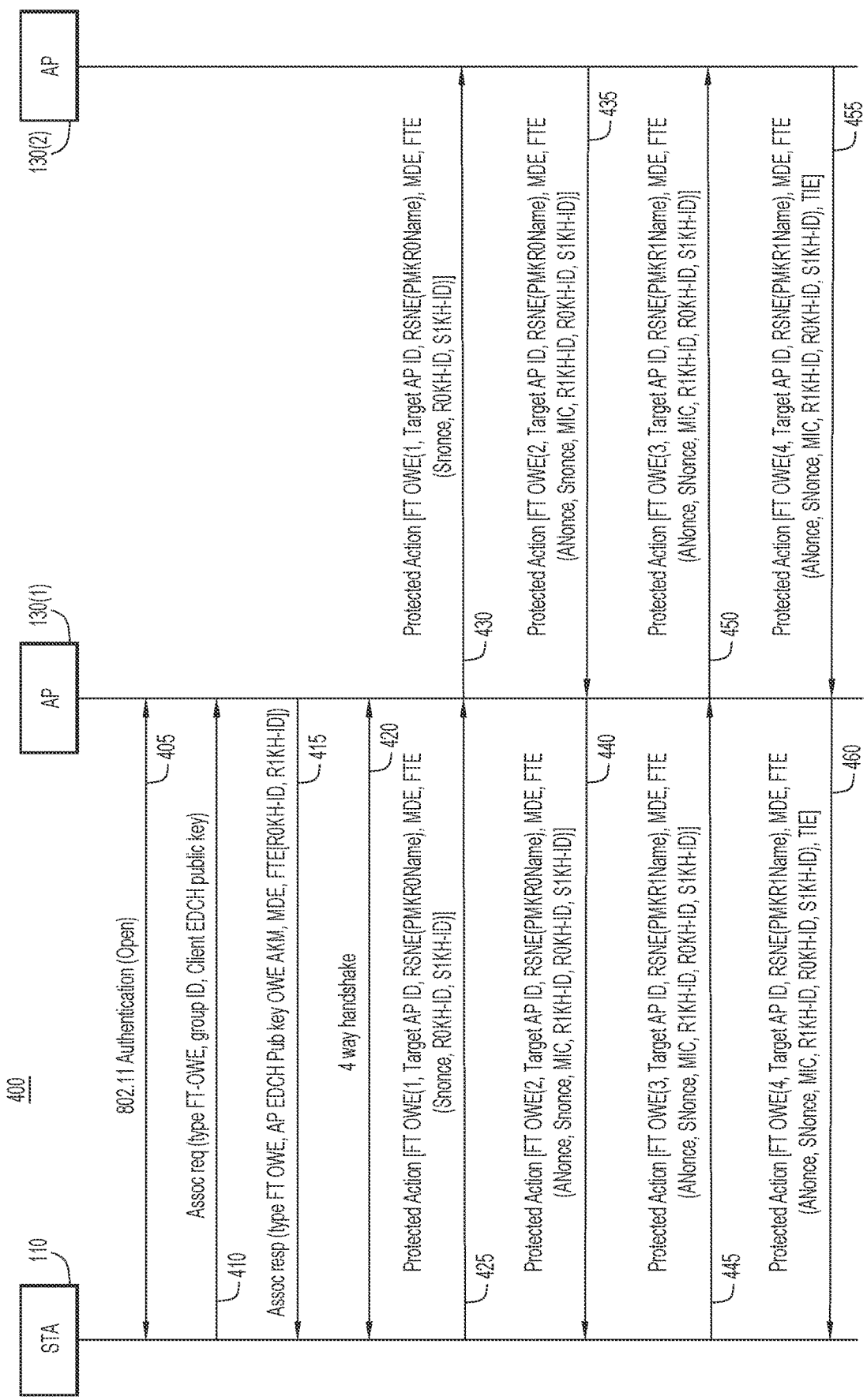
FIG. 4 illustrates a flow diagram of a method for AP verification using crowd-sourcing for an over-the-DS Opportunistic Wireless Encryption (OWE) scenario, according to an example embodiment.
Figure 5:
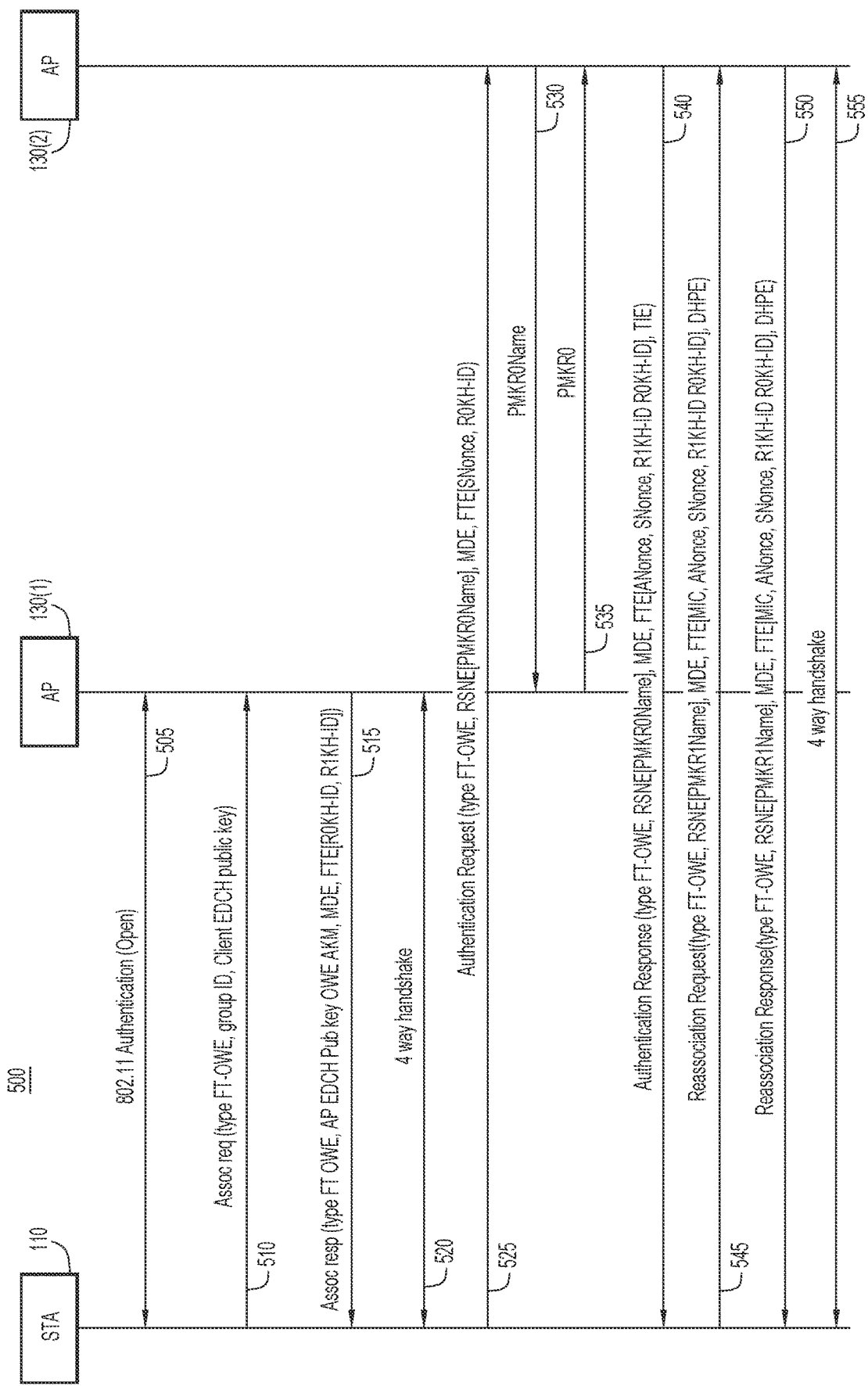
FIG. 5 illustrates a flow diagram of a method for AP verification using crowd-sourcing for an OTA OWE scenario, according to an example embodiment.

With continuing reference to FIG. 1, FIGS. 2-5 illustrate flow diagrams of respective methods 200, 300, 400, and 500 for AP verification using crowd-sourcing, according to example embodiments. FIGS. 2 and 3 illustrate PASN-FT scenarios: method 200 (FIG. 2) may apply to over-the-DS PASN-FT, and method 300 (FIG. 3) may apply to OTA PASN-FT. FIGS. 4 and 5 illustrate OWE-FT scenarios: method 400 (FIG. 4) may apply to over-the-DS OWE-FT, and method 500 (FIG. 5) may apply to OTA OWE-FT.

With reference first to FIG. 2, FIG. 2 illustrates a flow diagram of a method 200 for AP verification using crowd-sourcing for an over-the-DS PASN scenario, according to an example embodiment. At operation 205, AP 130(1) advertises support for PASN-FT in a frame (e.g., beacon/probe response). As shown, the frame includes a Robust Security Network Element (RSNE) that includes a base AKM (and/or other AKMs) of type PASN-FT, to allow for associations. The frame may also include a domain ID and an FT capability and policy field of the beacon may indicate support for the over-the-DS mode. The frame may also include the Mobility Domain Element (MDE), which allows multiple APs (e.g., APs 130(1) and 130(2)) to indicate that they belong to the same group.

At operation 210, STA 110 sends a first PASN-FT authentication frame to AP 130(1). The first PASN-FT authentication frame may include one or more of an RSNE with base AKM parameters, a list of zero or more PMKIDs, an ephemeral public key of STA 110 ("S-Ephemeral Pub"), PASN parameters, base AKM data, a time interval element, a Robust Security Network Extension Element (RSNXE), or an MDE. Security material that is used to establish a first non-verified connection between STA 110 and AP 130(1) may be exchanged in operation 210. In one example, the security material is the ephemeral public key of STA 110.

When a Robust Secure Network Association (RSNA) authentication is intended, STA 110 may select, based on operation 205, one base AKM, a pairwise cipher suite for a future Pairwise Temporal Key Security Association (PTKSA), a finite cyclic group (at least of a security strength provided by a base AKM and cipher suite). When an RSNA authentication is not intended, STA 110 may select, based on operation 205, a pairwise cipher suite for a future PTKSA and a finite cyclic group (at least of a security strength provided by a base AKM and cipher suite).

When a finite cyclic group is selected, STA 110 may generate an ephemeral private key and use the group scalar operation with the private key to generate an ephemeral public key. STA 110 may build an RSNE with the selected AKM, pairwise cipher suite, Management Frame Protection Capable (MFPC) and Management Frame Protection Required (MFPR) bits (in a Robust Secure Network (RSN) capabilities field) set to one (1) [Protected Management Frame (PMF) may be mandated], an extended key ID for individually addressed frames (bit 13) set to 0 [as the cipher suite may not be Counter Mode Cipher Block Chaining Message Authentication Code Protocol (CCMP) or Cisco Group Management Protocol (CGMP)], a group data cipher suite and group management cipher suite set to 00-0F-AC:7 [e.g., if group-addressed traffic is not allowed], a PMK ID count, and a PMK ID list set depending on PMK Security Association (SA) identifiers (if present).

At operation 215, AP 130(1) validates the first PASN-FT authentication frame and responds with a second authentication PASN-FT frame. The second PASN-FT authentication frame includes one or more of an RSNE that may include base AKM parameters and a pairwise cipher, MFPC and MFPR in the RSN capabilities field set to 1, no pairwise bit set to 0, a PMKID count of 1, a PMKID list corresponding to the PMKID from the PMKSA, if applicable, a group data cipher suite and group management cipher suite set to 00-0F-AC:7 (e.g., no group traffic allowed), and an extended key ID for individually addressed frames (bit 13) set to zero (0). The second PASN-FT authentication frame may also include an ephemeral public key of AP 130(1) ("A-Ephemeral Pub"), PASN parameters (e.g., in wrapped data format), the chosen finite cyclic group ID, a Fast Initial Link Setup (FILS) wrapped data element, base AKM data, a time interval element, RSNXE, a Message Integrity Check (MIC) element, or an MDE. Security material that is used to establish a first non-verified connection between STA 110 and AP 130(1) may be exchanged in operation 215. In one example, the security material is the ephemeral public key of AP 130(1).

At operation 220, STA 110 validates the second PASN-FT authentication frame and responds with a third PASN-FT authentication frame. The third PASN-FT authentication frame—which may complete the authentication exchange—may include one or more PASN parameters, a FILS wrapped data element, or a MIC element/value. The third PASN-FT authentication frame may indicate a success status because STA 110 and AP 130(1) have established a secure, but unassociated, connection using the respective ephemeral keys exchanged as part of operations 210 and 215.

At operations 225 and 230, in compliance with over-the-DS mode, STA 110 sends a first PASN FT action frame to AP 130(2) via AP 130(1). More specifically, at operation 225, STA 110 sends the first PASN-FT action frame to AP 130(1), and at operation 230, AP 130(1) relays the first PASN-FT action frame to AP 130(2) over the wire. PASN-FT frames of type "action" may be protected (robust).

The first PASN-FT action frame may include one or more of the BSSID of AP 130(2), the MDE, or a Fast BSS Transition Element (FTE). The FTE may include a S0 Key Holder Identifier (SOKH-ID). The SOKH-ID may indicate a MAC address of STA 110. STA 110 may generate/identify SOKH-ID as the MAC address to be used for the second non-verified connection with AP 130(2). As a result, the MAC address of STA 110 may be different for the first non-verified connection with AP 130(1) and the second non-verified connection with AP 130(2).

Thus, STA 110 may send to AP 130(1) a protected frame including both the current MAC address and the FTE (which includes the MAC address/S1KH-ID intended for use with AP 130(2). This may, for example, allow for RCM applications. Security material that is used to establish a second non-verified connection between STA 110 and AP 130(2) may be exchanged in operations 225 and 230. In one example, the security material is the ephemeral public key of STA 110.

At operations 235 and 240, AP 130(2) responds to the first PASN FT action frame with a second PASN-FT action frame sent to STA 110 via AP 130(1). More specifically, at operation 235, AP 130(2) sends the second PASN-FT action frame to AP 130(1) over the wire, and at operation 240, AP 130(1) relays the second PASN-FT action frame to STA 110. The second PASN-FT action frame may include one or more of an MDE, an address (e.g., a MAC address) of AP 130(2), an address (e.g., a MAC address) of STA 110 and/or a SOKH-ID, or a Fast BSS Transition Information Element (FTIE) with a timeout value. The MDE may indicate that AP 130(2) is part of the same group as AP 130(1). The address of STA 110 allows AP 130(1) to send the second PASN-FT action frame to STA 110. The FTE may be re-used to carry one or more elements.

Security material that is used to establish a second non-verified connection between STA 110 and AP 130(2) may be exchanged in operations 235 and 240. In one example, the security material is the ephemeral public key of STA 110. AP 130(2) may generate new keys that STA 110 can use as public keys for AP 130(2). Additionally/alternatively, as it relays the second PASN-FT action frame, AP 130(1) may modify the key fields. APs 130(1) and/or 130(2) may negotiate the key material, or AP 130(2) may determine the key material independently. At this stage, both STA 110 and AP 130(2) may have the security material needed to establish a secure but non-verified connection.

At operations 245 and 250, STA 110 validates the second PASN-FT action frame and sends a third PASN-FT action frame to AP 130(2) via AP 130(1). More specifically, at operation 245, STA 110 sends the third PASN-FT action frame to AP 130(1), and at operation 250, AP 130(1) relays the third PASN-FT action frame to AP 130(2) over the wire. The third PASN-FT frame—which may indicate successful status—may include one or more of a PASN parameters element, FILS wrapped data element, MIC element, FTE with the SOKH-ID value, and the address and/or BSSID of AP 130(2).

Any suitable amount of time may persist between the sending of the third PASN-FT action frame and the jump to AP 130(2). Thus, these techniques may provide STA 110 with flexibility to confirm up-front, so that the keys are validated, while avoiding a timeout which indicates that AP 130(2) is not responding and the keys are invalid. Also, instead of sending the third PASN-FT action frame to AP 130(2) via AP 130(1), STA 110 may send the third PASN-FT action frame directly to AP 130(1).

FIG. 3 illustrates a flow diagram of a method 300 for AP verification using crowd-sourcing for an OTA PASN scenario, according to an example embodiment. At operations 305-320, STA 110 may establish a session with AP 130(1). Operations 305, 310, 315 and 320 may be similar to operations 205, 210, 215 and 220, respectively, described above in connection with FIG. 2.

At operation 325, STA 110 may send to AP 130(2) a PASN authentication request frame. The frame type may be PASN-FT. The frame may include the MDE and the FTE. The FTE may include the PMKR0Name, MAC address of AP 130(1), and the S1KH-ID of STA 110. Based on the PMKR0Name, AP 130(2) may determine that STA 110 has already established a prior association. If the PASN authentication request frame may be unprotected, the MAC address of STA 110 may be the same for both APs 130(1) and 130(2).

At operation 330, AP 130(2) sends, to AP 130(1), a request for the A-Ephemeral Pub or the S-Ephemeral Pub. AP 130(2) may send the request over the wire/DS. AP 130(1) may determine that AP 130(2) is trusted and, at operation 335, may provide, to AP 130(2), an authentication response that includes the A-Ephemeral Pub or the S-Ephemeral Pub. In one specific example, STA 110 may send to AP 130(2) an indication of the S-Ephemeral Pub, and AP 130(2) may fetch from AP 130(1) the A-Ephemeral Pub.

At operation 340, AP 130(2) replies to STA 110 with an authentication response. The authentication response may be of type PASN-FT. AP 130(2) may add the MDE and the PMKR0Name in the authentication response to confirm that AP 130(2) is on the same root authentication structure as STA 110. At operation 345, STA 110 may send to AP 130(2) a frame that validates the authentication response. In one example, the frame may be of type PASN-FT.

Security material that is used to establish a second non-verified connection between STA 110 and AP 130(2) may be exchanged in operations 330-340. In one example, the security material is the A-Ephemeral Pub or the S-Ephemeral Pub. For instance, the authentication response from AP 130(2) may indicate to STA 110 that AP 130(2) was able to contact AP 130(1), and that AP 130(2) could obtain the S-Ephemeral Pub value. The communication may proceed between STA 110 and AP 130(2) based on the ability of AP 130(2) to retrieve the keying material.

FIG. 4 illustrates a flow diagram of a method 400 for AP verification using crowd-sourcing for an over-the-DS OWE scenario, according to an example embodiment. Initially, APs 130(1) and 130(2) may advertise support for OWE-FT using an AKM suite selector for OWE-FT in their beacons and probe responses. The OWE-FT mode may be announced by all APs (e.g., APs 130(1) and 130(2)) participating in wireless infrastructure 120. OWE-FT may be advertised as AKM mode in the probe responses and beacons of APs 130(1) and 130(2). The beacons/probe responses may include an organizationally unique identifier of 00-0F-AC, and the authentication type of the beacons/probe responses may be OWE-FT.

APs 130(1) and 130(2) may also announce/advertise a common MDE. The MDE may include a two-octet mobility domain identifier that names the mobility domain supported by all APs (e.g., APs 130(1) and 130(2)) in the same roaming domain. The FT capability and policy field may indicate whether FT is set to occur OTA or over-the-DS. In the example of FIG. 4, the FT capability and policy field may indicate that the FT is set to occur over-the-DS.

STA 110 may discover OWE-FT-compliant APs 130(1) and 130(2) using this information, and may also insert the MDE in its probe requests. In the case of a first association, APs 130(1) and 130(2) may announce support for OWE-FT and FT elements such as the MDE and an FT element which mentions the PMKR0. In one example, instead of negotiating a local PMK, the key negotiation may follow FT logic (e.g., key hierarchy with PMKR1). In the case of roaming, APs 130(1) and 130(2) may announce MDE support for OWE-FT.

Once STA 110 discovers an OWE-FT-compliant AP (here, AP 130(1)), at operation 405, STA 110 may perform an authentication with AP 130(1). STA 110 may then proceed to the OWE-FT association phase to establish a secure (but non-verified) association to AP 130(1). In particular, at operation 410, STA 110 may send, to AP 130(1), an association request frame. STA 110 may insert in the association request frame the MDE and a DH Parameter Element (DHPE) that includes the public key of STA 110.

At operation 415, AP 130(1) may send an association response frame that includes the DHPE, MDE, and FTE. The DHPE includes the public key of AP 130(1), and the FTE may include the R0KH-ID and the R1KH-ID for AP 130(1). The R0KH-ID may indicate the primary source of the public key. For example, the public key of AP 130(1) may be generated by AP 130(1) or controller 140, and thus may be common to both APs 130(1) and 130(2). The R1KH-ID may indicate the core MAC address of AP 130(1).

At operation 420, from these elements, AP 130(1) and STA 110 may establish the PMKR0 and PMKR1 values. The transient keys (e.g., PTK) may be used to exchange data securely. At this point, STA 110 may have knowledge of two PMKs: one primary PMK (PMKR0)—which may be valid through all APs (e.g., APs 130(1) and 130(2))—and an AP-specific PMK (PMKR1). The PMKR1 may be derived from PMKR0 in combination with AP parameters (e.g., nonce and MAC address of AP 130(1)) and STA parameters (e.g., nonce and MAC address of STA 110). Thus, once association is completed, STA 110 and AP 130(1) may derive the PMKR0, followed by the PMK-R1 for the STA-AP pair, and then the matching PTK.

Security material that is used to establish a first non-verified connection between STA 110 and AP 130(1) may be exchanged in operations 410-420. For example, the security material may be one or more of the elements used to establish the PMKR0 and PMKR1 values (e.g., DHPE, MDE, and/or FTE). As a result, this mode may allow AP 130(1) to exchange data securely with AP 130(1) as part of a secured but non-verified association.

Later, STA 110 may establish a secure association to communicate with AP 130(2). AP 130(2) may be part of the same mobility domain as AP 130(1). While the authentication is still valid, STA 110 may proceed through an OWE-FT re-association exchange with AP 130(2). STA 110 may discover AP 130(2) through a scanning process during which the MAC address of AP 130(2) is discovered. In this example, STA 110 may pre-establish its non-verified but secure association to AP 130(2) through AP 130(1), thus ensuring that AP 130(1) has a trusted backend connection with AP 130(1).

At operation 425, STA 110 sends to AP 130(1) an OWE-FT request. The request is an action frame, and includes the MAC address of STA 110, the BSSID of AP 130(2), the RSNE with the PMKR0 name, the MDE, and the FTE with a SNonce and the R0KH-ID. At operation 430, AP 130(1) passes the request, over the DS, to AP 130(2).

At operation 435, AP 130(2) responds with an FT response containing the MAC address of STA 110, the BSSID of AP 130(2), the RSNE with the PMKR0 name, the MDE, and the FTE. The FTE includes a MIC, ANonce, SNonce, R1KH-ID for AP 130(2), and R0KH-ID. At operation 440, AP 130(1) passes the response to STA 110. Thus, AP 130(2) may relay this response to STA 110, via AP 130(1), through an FT response action frame.

At operation 445, STA 110 may respond to the FT response action frame by sending an FT confirm action frame to AP 130(1). The frame may include the BSSID of AP 130(2), the RSNE with the PMK-R1 name (derived from the PMK-R0 Name), the MDE, and the FTE. The FTE may include the ANonce, SNonce, MIC, R1KH-ID obtained from AP 130(2), R0KH-ID, and MAC address of STA 110 (e.g., S1KH-ID). At operation 450, AP 130(1) forwards this message over the DS to AP 130(2).

At operation 455, AP 130(2) may reply, to AP 130(1), with an FT acknowledgement (ACK) message. The FT ACK message may include the MAC address of STA 110, the BSSID of AP 130(2), the RSNE with the PMK-R1 Name, the MDE, the FTE, and a Timeout Interval Element (TIE) that specifies the re-association deadline value. The FTE may include the ANonce, Snonce, MIC, R1KH-ID, R0KH-ID, and S1KH-ID. At operation 460, AP 130(1) may forward the FT ACK message to AP 130(2). At this stage, the OWE-FT authentication to AP 130(2) has completed, and stays valid until the expiration of the re-association deadline time. STA 110 may establish such authentication to multiple target APs.

Security material that is used to establish a second non-verified connection between STA 110 and AP 130(2) may be exchanged in operations 425-460. In one example, the security material may include the R1KH-ID, R0KH-ID, and/or S1KH-ID. While the authentication is still valid, STA 110 may associate to AP 130(2) and proceed to secure exchanges. STA 110 may then proceed through an OWE-FT reassociation exchange with AP 130(2).

FIG. 5 illustrates a flow diagram of a method for AP verification using crowd-sourcing for an OTA OWE scenario, according to an example embodiment. Initially, APs 130(1) and 130(2) may advertise support for OWE-FT using an AKM suite selector for OWE-FT in their beacons and probe responses. The OWE-FT mode may be announced by all APs (e.g., APs 130(1) and 130(2)) participating in wireless infrastructure 120. OWE-FT may be advertised as AKM mode in the probe responses and beacons of APs 130(1) and 130(2). The beacons/probe responses may include an organizationally unique identifier of 00-0F-AC, and the authentication type of the beacons/probe responses may be OWE-FT.

APs 130(1) and 130(2) may also announce/advertise a common MDE. The MDE may include a two-octet mobility domain identifier that names the mobility domain supported by all APs (e.g., APs 130(1) and 130(2)) in the same roaming domain. The FT capability and policy field may indicate whether FT is set to occur OTA or over-the-DS. In the example of FIG. 5, the FT capability and policy field may indicate that the FT is set to occur OTA.

STA 110 may discover OWE-FT-compliant APs 130(1) and 130(2) using this information, and may also insert the MDE in its probe requests. In the case of a first association, APs 130(1) and 130(2) may announce support for OWE-FT and FT elements such as the MDE and an FT element which mentions the PMKR0. In one example, instead of negotiating a local PMK, the key negotiation may follow FT logic (e.g., key hierarchy with PMKR1). In the case of roaming, APs 130(1) and 130(2) may announce MDE support for OWE-FT.

Operations 505, 510, 515 and 520 may be similar to operations 405, 410, 415 and 420 (FIG. 4). In some examples, security material that is used to establish a first non-verified connection between STA 110 and AP 130(1) may be exchanged in operations 510-520. For example, the security material may be one or more of the elements used to establish the PMKR0 and PMKR1 values (e.g., DHPE, MDE, and/or FTE). As a result, this mode may allow STA 110 to exchange data securely with AP 130(1) as part of a secured but non-verified association.

At operation 525, STA 110 sends, to AP 130(2), an OWE-FT authentication request. The OWE-FT authentication request indicates OWE-FT as the authentication algorithm, and includes an RSNE with the PMKR0 name value, MDE, and FTE with a Snonce and R0KH-ID. STA 110 may repeat this process with any other suitable number of APs. In one example, STA 110 may authenticate to multiple APs, but may only associate to one AP at a time.

STA 110 may communicate with AP 130(1) or controller 140, recognize the PMKR0 name and R0KH-ID, and derive the information needed to derive a PMKR1 value. In this example, STA 110 communicates with AP 130(1). At operation 530, AP 130(2) may provide, to AP 130(1), an indication of the PMKR0 name. At operation 535, AP 130(1) may respond, to AP 130(2), with the PMKR0.

At operation 540, AP 130(2) replies with an OWE-FT authentication response. The OWE-FT authentication response may indicate OWE-FT as the authentication algorithm. The OWE-FT authentication response may include the RSNE with the PMKR0 name value, the MDE, the FTE, and the TIE (e.g., an expiration timer that expresses the timeout for this authentication). The FTE may include the Anonce, Snonce, the R0KH-ID, and the R1KH-ID for AP 130(2). At this stage, the OWE-FT authentication to AP 130(2) has completed, and stays valid until the expiration of the re-association deadline time. STA 110 may establish such authentication to any suitable number of APs.

Later, STA 110 may associate to AP 130(2) and proceed to securely exchange information with AP 130(2) over a secure channel. In particular, at operation 545, while the authentication is still valid, STA 110 may send an OWE-FT re-association request to AP 130(2). The request may include the RSNE with the PMK-R1 name value, the MDE, the FTE (including the MIC, ANonce, SNonce, R1KH1-ID obtained during the authentication phase, and R0KH-ID), and the DHPE (including public key of STA 110).

At operation 550, AP 130(2) responds with an OWE-FT re-association response. The response includes the RSNE with the PMK-R1 name for AP 130(2), the MDE, the FTE (including the MIC, ANonce, SNonce, R1KH1-ID for AP 130(2), and R0KH-ID), and the DHPE (including the public key for STA 110). At operation 555, STA 110 and AP 130(2) may perform a four-way handshake. For example, at the conclusion of the re-association, STA 110 and AP 130(2) may compute the PMK-R1 and the matching PTK. If the first frame is not protected, the MAC address of STA 110 may be the same on both APs 130(1) and 130(2).

Security material that is used to establish a second non-verified connection between STA 110 and AP 130(2) may be exchanged in operations 425-460. In one example, the security material may include the PMKR0 value. The PMKR0 value may be the same primary public key associated with AP 130(1), thus ensuring that both APs 130(1) and 130(2) have the same private key and therefore have a trusted connection and relationship. Thus, in this example, STA 110 may pre-establish its unauthenticated but secure association to AP 130(2) directly through AP 130(2) OTA using the PMKR0 value.

Figure 6:
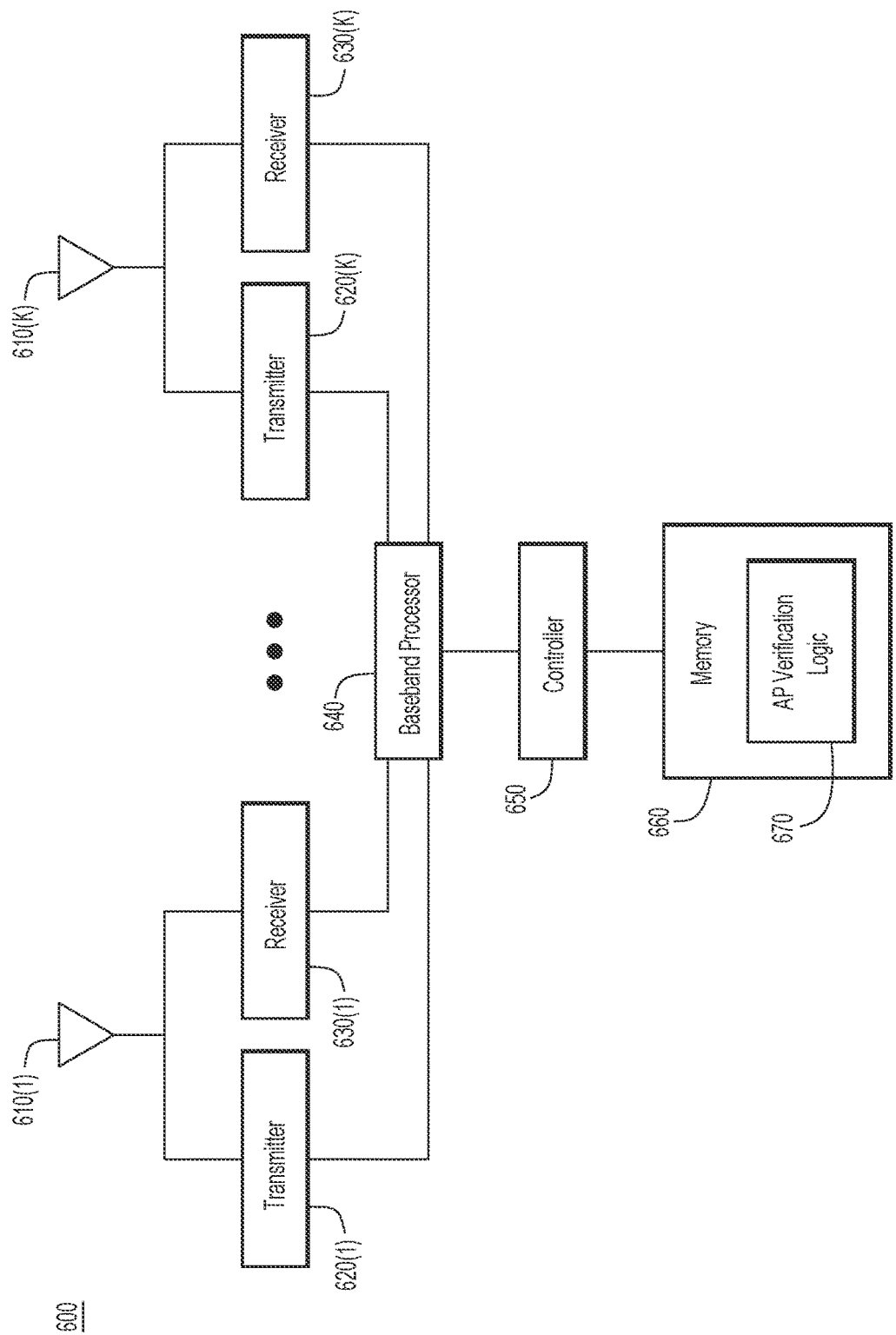
FIG. 6 illustrates a hardware block diagram of a computing device configured to perform functions associated with operations discussed herein, according to an example embodiment.

Referring to FIG. 6, FIG. 6 illustrates a hardware block diagram of a computing device 600 that may perform functions associated with operations discussed herein in connection with the techniques depicted in FIG. 1-5. In various embodiments, a computing device, such as computing device 600 or any combination of computing devices 600, may be configured as any entity/entities as discussed for the techniques depicted in connection with FIGS. 1-5 in order to perform operations of the various techniques discussed herein. In one specific example, computing device 600 may include AP 130(1) or AP 130(2).

Computing device 600 includes antennas 610(1)-610(K), transmitters 620(1)-620(K), receivers 630(1)-630(K), baseband processor (e.g., modem) 640, controller (e.g., hardware processor) 650, and memory 660. Each transmitter 620(1)-620(K) is connected to a corresponding one of antennas 610(1)-610(K), and likewise each receiver 630(1)-630(K) is connected to a corresponding one of antennas 610(1)-610(K). Baseband processor 640 may be implemented by fixed or programmable digital logic gates, such as in the form of an application specific integrated circuit (ASIC), or may be implemented by a dedicated digital signal processor, microprocessor or microcontroller.

Controller 650 is coupled to baseband processor 640 and provides higher level control for computing device 600. Controller 650 may be a microprocessor or microcontroller. Memory 660 stores instructions that controller 650 executes to perform the control functions of the computing device 600. Among these functions are operations performed when controller 650 executes AP verification logic 670 stored in memory 660. AP verification logic 670 may include AP verification logic 150(1) or AP verification logic 150(2) (FIG. 1). In various embodiments, instructions associated with logic for computing device 600 can overlap in any manner and are not limited to the specific allocation of instructions and/or operations described herein.

In at least one embodiment, controller 650 may be at least one hardware processor configured to execute various tasks, operations and/or functions for computing device 600 as described herein according to software and/or instructions configured for computing device 600. Controller 650 can execute any type of instructions associated with data to achieve the operations detailed herein. In one example, controller 650 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory 660 is configured to store data, information, software, and/or instructions associated with computing device 600, and/or logic configured for memory 660. For example, any logic described herein (e.g., AP verification logic 670) can, in various embodiments, be stored for computing device 600 using memory 660.

In various embodiments, AP verification logic 670 can include instructions that, when executed, cause controller 650 to perform operations, which can include, but not be limited to, providing overall control operations of computing device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., AP verification logic 670) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory.' Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory 660 can store data, software, code, instructions (e.g., processor instructions), logic, parameters, combinations thereof, and/or the like used for operations described herein. This includes memory 660 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 600 for transfer onto another computer readable storage medium.

Figure 7:
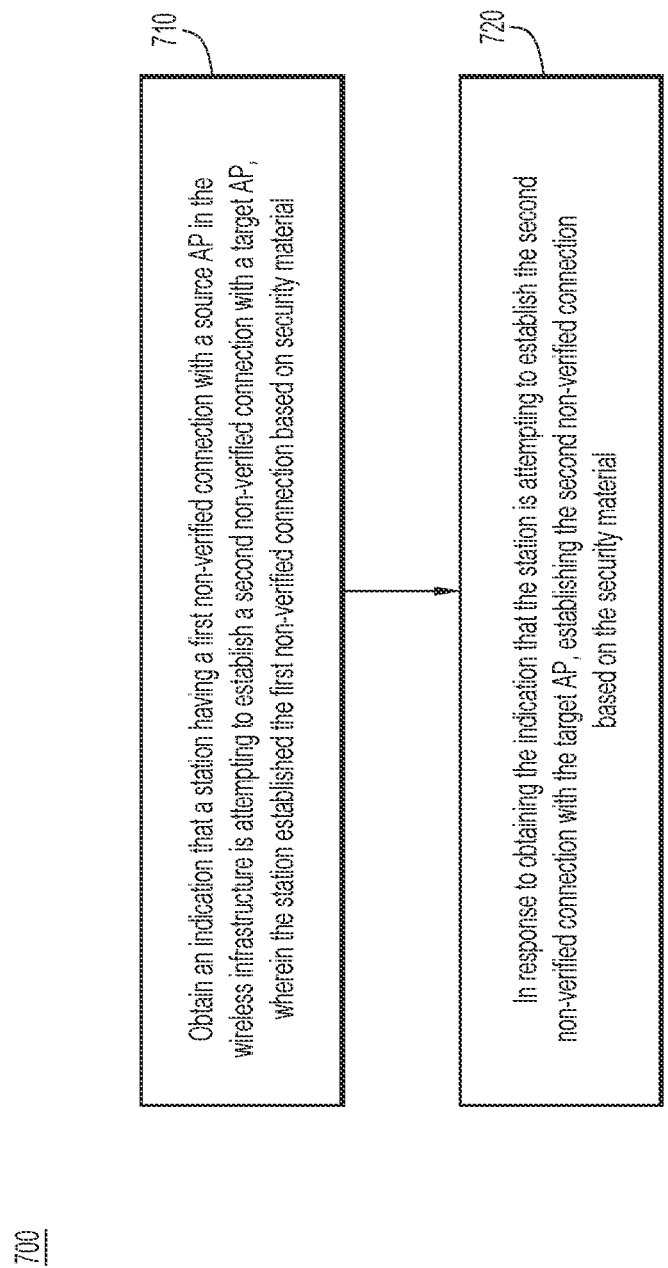
FIG. 7 illustrates a flowchart of a method for performing functions associated with operations discussed herein, according to an example embodiment.

FIG. 7 is a flowchart of an example method 700 for performing functions associated with operations discussed herein. Method 700 may be performed by any suitable entity, such as computing device 600 (FIG. 6). At operation 710, computing device 600 obtains an indication that a STA having a first non-verified connection with a source AP in the wireless infrastructure is attempting to establish a second non-verified connection with a target AP, wherein the STA established the first non-verified connection based on security material. At operation 720, in response to obtaining the indication that the STA is attempting to establish the second non-verified connection with the target AP, computing device 600 establishes the second non-verified connection based on the security material.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: at a target AP in a wireless infrastructure: obtaining an indication that a STA having a first non-verified connection with a source AP in the wireless infrastructure is attempting to establish a second non-verified connection with the target AP, wherein the STA established the first non-verified connection based on security material; and in response to obtaining the indication that the STA is attempting to establish the second non-verified connection with the target AP, establishing the second non-verified connection based on the security material.

In one example, the method further comprises: at the target AP: obtaining the indication that the STA is attempting to establish the second non-verified connection from the source AP.

In one example, the STA established the first non-verified connection using a first Media Access Control (MAC) address of the STA and is attempting to establish the second non-verified connection using a second MAC address of the STA.

In one example, the method further comprises: at the target AP: obtaining the indication that the STA is attempting to establish the second non-verified connection from the STA.

In one example, the method further comprises: at the target AP: obtaining the security material from the source AP. In another example, the method further comprises: at the target AP: obtaining the security material from a management device or process associated with the wireless infrastructure.

In one example, the security material includes one or more of a key or a key name.

In one example, the first non-verified connection is a first PASN connection, and obtaining the indication that the STA is attempting to establish the second non-verified connection includes obtaining an indication that the STA is attempting to establish a second PASN connection. In another example, the first non-verified connection is a first OWE connection, and obtaining the indication that the STA is attempting to establish the second non-verified connection includes obtaining an indication that the STA is attempting to establish a second OWE connection.

In another form, an apparatus is provided. The apparatus comprises: an interface configured to obtain or provide network communications; and one or more controllers coupled to the interface, wherein the one or more controllers are configured to: obtain an indication that a STA having a first non-verified connection with a source AP in a wireless infrastructure is attempting to establish a second non-verified connection with the apparatus in the wireless infrastructure, wherein the STA established the first non-verified connection based on security material; and in response to obtaining the indication that the STA is attempting to establish the second non-verified connection with the apparatus, establish the second non-verified connection based on the security material.

In another form, one or more non-transitory computer readable storage media are provided. The non-transitory computer readable storage media are encoded with instructions that, when executed by a when executed by a controller of a target AP in a wireless infrastructure, cause the controller to: obtain an indication that a STA having a first non-verified connection with a source AP in the wireless infrastructure is attempting to establish a second non-verified connection with the target AP, wherein the STA established the first non-verified connection based on security material; and in response to obtaining the indication that the STA is attempting to establish the second non-verified connection with the target AP, establish the second non-verified connection based on the security material.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   at a target Access Point (AP) in a wireless infrastructure:
   obtaining an indication that a station having a first non-verified connection with a source AP in the wireless infrastructure is attempting to establish a second non-verified connection with the target AP, wherein the station established the first non-verified connection based on security material; and
   in response to obtaining the indication that the station is attempting to establish the second non-verified connection with the target AP, establishing the second non-verified connection based on the security material,
   wherein the first non-verified connection is established before performing reciprocal identity validation between the station and the source AP, and the second non-verified connection is established before performing reciprocal identity validation between the station and the target AP, and wherein the source AP and the target AP are APs in a same Extended Service Set (ESS).

2. The method of claim 1, further comprising:
   at the target AP:
   obtaining the indication that the station is attempting to establish the second non-verified connection from the source AP.

3. The method of claim 1, wherein the station established the first non-verified connection using a first Media Access Control (MAC) address of the station and is attempting to establish the second non-verified connection using a second MAC address of the station.

4. The method of claim 1, further comprising:
   at the target AP:
   obtaining the indication that the station is attempting to establish the second non-verified connection from the station.

5. The method of claim 1, further comprising:
   at the target AP:
   obtaining the security material from the source AP.

6. The method of claim 1, further comprising:
   at the target AP:
   obtaining the security material from a management device or process associated with the wireless infrastructure.

7. The method of claim 1, wherein the security material includes one or more of a key or a key name.

8. The method of claim 1, wherein the first non-verified connection is a first Pre-Association Security Negotiation (PASN) connection, and wherein:
   obtaining the indication that the station is attempting to establish the second non-verified connection includes obtaining an indication that the station is attempting to establish a second PASN connection.

9. The method of claim 1, wherein the first non-verified connection is a first Opportunistic Wireless Encryption (OWE) connection, and wherein:
   obtaining the indication that the station is attempting to establish the second non-verified connection includes obtaining an indication that the station is attempting to establish a second OWE connection.

10. An apparatus comprising:
    an interface configured to obtain or provide network communications; and
    one or more controllers coupled to the interface, wherein the one or more controllers are configured to:
    obtain an indication that a station having a first non-verified connection with a source AP in a wireless infrastructure is attempting to establish a second non-verified connection with the apparatus in the wireless infrastructure, wherein the station established the first non-verified connection based on security material; and
    in response to obtaining the indication that the station is attempting to establish the second non-verified connection with the apparatus, establish the second non-verified connection based on the security material,
    wherein the first non-verified connection is established before performing reciprocal identity validation between the station and the source AP, and the second non-verified connection is established before performing reciprocal identity validation between the station and the apparatus, and wherein the source AP and the apparatus are APs in a same Extended Service Set (ESS).

11. The apparatus of claim 10, wherein the one or more controllers are further configured to:
    obtain the indication that the station is attempting to establish the second non-verified connection from the source AP.

12. The apparatus of claim 10, wherein the station established the first non-verified connection using a first Media Access Control (MAC) address of the station and is attempting to establish the second non-verified connection using a second MAC address of the station.

13. The apparatus of claim 10, wherein the one or more controllers are further configured to:

obtain the indication that the station is attempting to establish the second non-verified connection from the station.

14. The apparatus of claim 10, wherein the one or more controllers are further configured to:
obtain the security material from the source AP.

15. The apparatus of claim 10, wherein the one or more controllers are further configured to:
obtain the security material from a management device or process associated with the wireless infrastructure.

16. One or more non-transitory computer readable storage media encoded with instructions that, when executed by a controller of a target Access Point (AP) in a wireless infrastructure, cause the controller to:
obtain an indication that a station having a first non-verified connection with a source AP in the wireless infrastructure is attempting to establish a second non-verified connection with the target AP, wherein the station established the first non-verified connection based on security material; and
in response to obtaining the indication that the station is attempting to establish the second non-verified connection with the target AP, establish the second non-verified connection based on the security material,
wherein the first non-verified connection is established before performing reciprocal identity validation between the station and the source AP, and the second non-verified connection is established before performing reciprocal identity validation between the station and the target AP, and wherein the source AP and the target AP are APs in a same Extended Service Set (ESS).

17. The one or more non-transitory computer readable storage media of claim 16, wherein the instructions further cause the controller to:
obtain the indication that the station is attempting to establish the second non-verified connection from the source AP.

18. The one or more non-transitory computer readable storage media of claim 16, wherein the station established the first non-verified connection using a first Media Access Control (MAC) address of the station and is attempting to establish the second non-verified connection using a second MAC address of the station.

19. The one or more non-transitory computer readable storage media of claim 16, wherein the instructions further cause the controller to:
obtain the indication that the station is attempting to establish the second non-verified connection from the station.

20. The one or more non-transitory computer readable storage media of claim 16, wherein the instructions further cause the controller to:
obtain the security material from the source AP or from a management device or process associated with the wireless infrastructure.

* * * * *